(12) United States Patent
Balasubramaniam (10) Patent No.: US 10,132,995 B2
(45) Date of Patent: Nov. 20, 2018

(54) STRUCTURES MONITORING SYSTEM AND METHOD

(71) Applicant: General Electric Company, Schenectady, NY (US)

(72) Inventor: Mahadevan Balasubramaniam, Ballston Lake, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 359 days.

(21) Appl. No.: 14/564,148

(22) Filed: Dec. 9, 2014

(65) Prior Publication Data
US 2016/0161350 A1    Jun. 9, 2016

(51) Int. Cl.
*G01L 1/24* (2006.01)
*G02B 6/02* (2006.01)
*G01M 5/00* (2006.01)

(52) U.S. Cl.
CPC .............. *G02B 6/022* (2013.01); *G01L 1/246* (2013.01); *G01M 5/0025* (2013.01)

(58) Field of Classification Search
CPC ..... G01L 11/025; G01L 1/246; G01L 27/007; G01D 5/35316
USPC .......... 73/800, 608; 324/76.37; 374/E11.016
See application file for complete search history.

(56) References Cited

U.S. PATENT DOCUMENTS

| | | | |
|---|---|---|---|
| 6,233,374 B1 | 5/2001 | Ogle et al. | |
| 6,854,327 B2 | 2/2005 | Rambow et al. | |
| 7,461,561 B2 | 12/2008 | Morrison et al. | |
| 7,721,611 B2 | 5/2010 | Salama | |
| 2006/0115335 A1 | 6/2006 | Allen et al. | |
| 2006/0233485 A1 | 10/2006 | Allen | |

(Continued)

FOREIGN PATENT DOCUMENTS

| | | | | |
|---|---|---|---|---|
| WO | 2012178143 A1 | 12/2012 | | |
| WO | WO 2013135244 A1 * | 9/2013 | ............ | F16L 11/088 |

OTHER PUBLICATIONS

Hares et al., "Midstream & Subsea Pipeline Condition Monitoring", Offshore Technology Conference, OTC 21767, May 2-5, 2011, pp. 1-14, Houston, Texas, USA.

(Continued)

*Primary Examiner* — Lisa Caputo
*Assistant Examiner* — Roger Hernandez-Prewit
(74) *Attorney, Agent, or Firm* — GE Global Patent Operation; Nitin Joshi (57) ABSTRACT

A sensing system that includes an optical fiber disposed helically around an outer surface of a structure along a longitudinal axis of the structure is provided. The optical fiber is disposed such that at least one complete helical turn of the optical fiber covers the length of the structure. Further, the sensing system also includes a fiber Bragg grating (FBG) set comprising a plurality of FBGs in the optical fiber. Each FBG in the set is configured to generate reflected light that is indicative of strain values at a location of each respective FBG on the optical fiber. Furthermore, the system also includes a processing system coupled to the optical fiber. The processing system is configured to determine location coordinates of each FBG and values of one or more of bending moment, tensile force, and torsional moment acting at each FBG location on the optical fiber.

20 Claims, 4 Drawing Sheets

(56) References Cited

U.S. PATENT DOCUMENTS

| | | | |
|---|---|---|---|
| 2008/0285909 A1* | 11/2008 | Younge | A61B 5/1076 385/13 |
| 2011/0109898 A1* | 5/2011 | Froggatt | G01B 11/18 356/73.1 |
| 2012/0143521 A1* | 6/2012 | Chen | G01L 1/246 702/42 |
| 2012/0222770 A1 | 9/2012 | Kristiansen et al. | |

OTHER PUBLICATIONS

"Specialty Fiber Optic Cable", Catalog, 2008, AFL, Revision 2, Sep. 16, 2011, 69 Pages.

* cited by examiner

STRUCTURES MONITORING SYSTEM AND METHOD

BACKGROUND

Embodiments of the present invention relate generally to structures, particularly but not exclusively subsea structures, and more specifically, to a structure monitoring system and method.

Subsea production risers typically include several kilometer long kilometer-long pipes linking seabed equipment with surface production facilities. As the subsea installation is located deeper and deeper, there is a growing need for monitoring the dynamic behavior of the pipes connected to it. Monitoring strain of the pipes is a way to assess their operating conditions. In typical operating conditions, risers are subject to very complex loads, including self-weight, internal pressure from the production fluid, static deformation caused by the surface facility, tension from buoyancy modules attached to the structure, Vortex Induced Vibrations, and installation related stresses when the risers are being deployed. These loads generate mechanical stresses on the riser pipes. Risers are designed according to a certain set of load scenarios, in order to operate reliably in real conditions.

One critical aspect of riser engineering is its dynamic behavior during operation, during which it is subjected to loads changing with time. The typical resonance frequency range for a vertical rigid riser is in the range of 10-3-10 Hz. Typically, 100 frequency modes are of interest for a subsea riser pipe. Various systems have been developed or proposed for the monitoring of risers' mechanical behavior in the field. One is based on the monitoring of riser movement using an accelerometer platform. Another approach is the direct measurement of the strain within the riser. One proposed approach is to use optical fibers as strain gauges. There are several ways of measuring strain in optical fibers. Strain measurement can either be localized, semi-distributed or distributed depending on the technology used for the interrogation of the fibers. Distributed strain measurement along an optical fiber can be done through Brillouin scattering. Brillouin measurements can also provide distributed temperature measurements. Brillouin based measurements can be made along few 10s of km of optical fiber. However, Brillouin measurement also has limitations. Its spatial resolution is in the range of a few meters and measurement time can be in the range of a few minutes. Therefore, it is not very suitable for measurement of dynamic strain above a few 10s of MilliHertz. This is a significant limitation, considering the typical resonance frequency range of a riser pipe.

Another approach for measurement of strain on riser pipes includes utilizing fiber Bragg gratings (FBGs) that are distributed along a length of the optical fiber which covers the length of the riser pipe between the surface facility and the touchdown point of the riser pipe. However, the number of frequency modes that need to be studied and the length of riser pipes leads to an increase in the number of gratings that need to be defined on the fiber to measure stresses acting on the length of the riser pipe. Further, in this approach, one fiber is utilized to study one particular type of stress (elongation or contraction along the FBG) acting on the riser pipe. Hence, to analyze the stress state of the riser, one would require multiple fibers coupled to the riser pipe at different angular positions.

The number of gratings and fiber cables required to study all stresses acting on the pipe make current approaches expensive. Further, multiple fibers and gratings make the installation process complex and add to installation costs. Further, the dependence on multiple gratings installed in parallel on the pipe also adds to the inaccuracy that may creep into measurements.

Hence, there is a need for a method and system that utilizes optimal gratings to study stress and a single fiber to cover the riser pipe with these gratings.

BRIEF DESCRIPTION

According to one embodiment, a sensing system is provided. The sensing system includes an optical fiber disposed helically around an outer surface of a structure along a longitudinal axis of the structure. The optical fiber is disposed such that at least one complete helical turn of the optical fiber covers the length of the structure. Further, the sensing system also includes a fiber Bragg grating (FBG) set comprising a plurality of FBGs in the optical fiber. Each FBG in the set is configured to generate reflected light that is indicative of strain values at a location of each respective FBG on the optical fiber. Furthermore, the system also includes a processing system coupled to the optical fiber. The processing system is configured to determine location coordinates of each FBG and values of one or more of bending moment, tensile force, and torsional moment acting at each FBG location on the optical fiber.

According to another embodiment, a method for monitoring a structure is provided. The method includes transmitting light through an optical fiber. The optical fiber comprises a fiber Bragg grating (FBG) set that comprises a plurality of FBGs. Further, the optical fiber is disposed helically around the structure along a longitudinal axis of the structure such that at least one complete helical turn of the optical fiber covers a longitudinal length of the structure and the FBG set is disposed on the at least one complete helical turn. Further, the method includes receiving reflected light from the plurality of FBGs in response to the transmitted light. Furthermore, the method includes determining strain observed at each location of the FBGs on the structure based on an analysis of the reflected light from the plurality of FBGs. Furthermore, the method also includes determining location coordinates of each of the plurality of FBGs and values of one or more of bending moment, tensile force, and torsional moment acting at each FBG location on the optical fiber.

DRAWINGS

Other features and advantages of the present disclosure will be apparent from the following more detailed description of the preferred embodiment, taken in conjunction with the accompanying drawings which illustrate, by way of example, the principles of certain aspects of the disclosure.

DETAILED DESCRIPTION

As will be described in detail hereinafter, various embodiments of a system and method for monitoring structures are presented.

In accordance with aspects of present disclosure, structures are monitored using a sensing system that includes an optical fiber and a plurality of fiber Bragg gratings (FBGs). In certain embodiments, the structures are subsea structures. Examples of subsea structures that can be monitored using the sensing system and method of monitoring include, but are not limited to, a casing, a riser pipe, a sand screen, an umbilical, a tubing, or a pipeline. Riser pipes (which also may be referred to herein as risers) are commonly used in offshore oil and gas installations to connect surface and subsea facilities. Risers convey hydrocarbons and ancillary fluids, and conventionally have a multilayered construction. The layers include fluid barriers, helical armoring, anti-wear, and specialized layers that depend on the application (e.g. thermal insulation). An umbilical houses control lines that supply power, communications, fluid injection or lift and normally includes armoring layers. While embodiments of the present invention are described as utilizing subsea structures as example, the system and method are equally applicable to topside or land-based structures such as pipelines, motors, generators, and other equipment that require remote monitoring.

The sensing system includes an optical fiber that is disposed helically around an outer surface of the structure along a longitudinal axis of the structure such that at least one complete helical turn of the optical fiber covers the length of the structure. Further, the system also includes an FBG set that includes a plurality of FBGs. Each FBG in the set is configured to generate reflected light that is indicative of strain values at a location of each respective FBG on the optical fiber. The FBG set is defined such that all FBGs in the FBG set are placed on one helical turn of the optical fiber. Further, the FBGs are placed at a particular orientation angle with respect to the longitudinal axis of the structure. Furthermore, the system includes a processing system that is configured to determine location coordinates of each FBG and values of one or more of bending moment, tensile stress, and torsional moment acting at each FBG location coordinate on the optical fiber.

Figure 1:
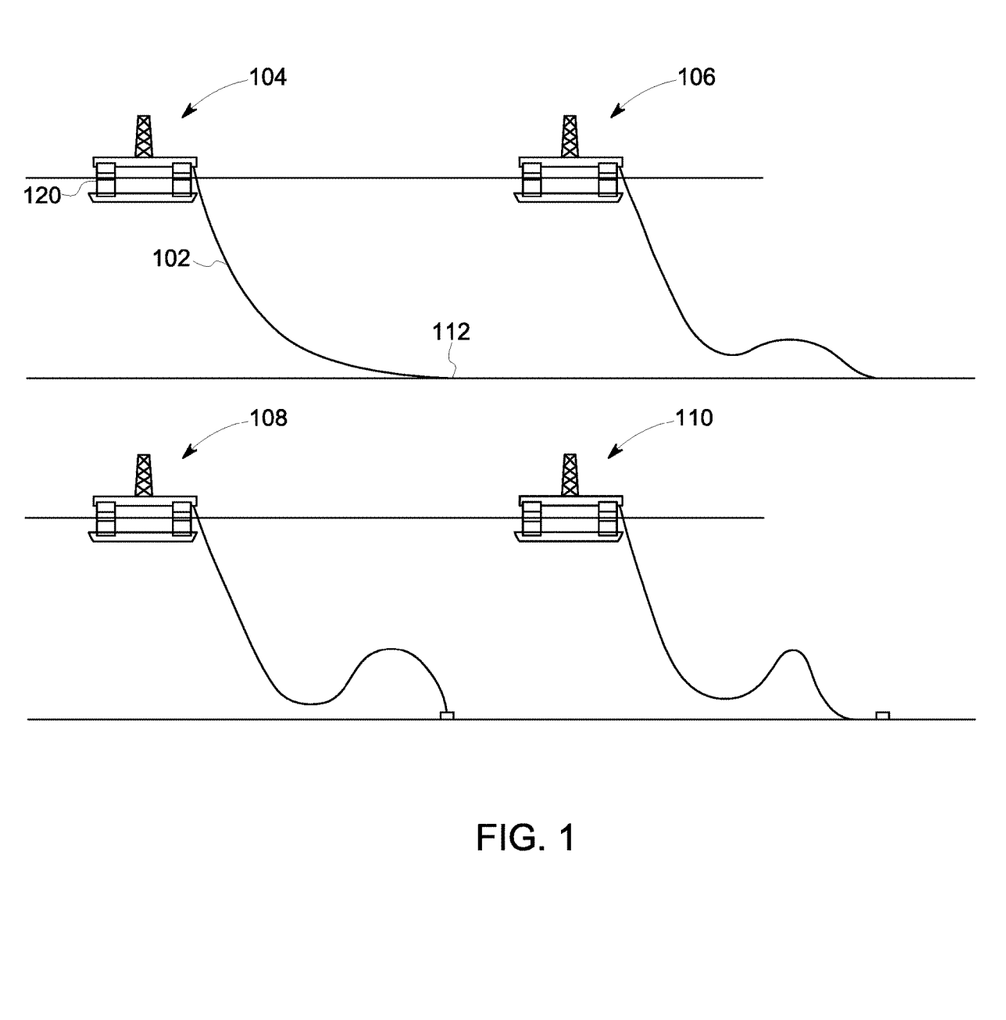
FIG. 1 illustrates exemplary embodiments of riser pipes submerged underwater with the aid of surface facilities.

FIG. 1 illustrates exemplary embodiments of riser pipes submerged underwater with the aid of surface facilities. FIG. 1 specifically shows configurations 104-110 of a structure 102, such as a riser pipe, between surface facilities and seabed locations. In typical oil and gas subsea exploration and extraction systems, the structure 102 is released from a surface facility such as a vessel 120 to explore the seabed and extract oil and gas from the seabed. The distance between the surface facility 120 and a "touchdown" point 112 of the structure 102 on the seabed may vary from tens of meters to a few kilometers. The location of the "touchdown point" 112 is dependent on the riser configuration and environmental loading from external and internal sources. When the structure 102 is lowered underwater, the structure 102 assumes one of the configurations 104, 106, 108, 110, or a combination of these configurations. Configuration 104 is termed as "free hanging" in which the structure 102 does not display any wave formation between the facility 120 and the touchdown point 112. Further, configuration 106 is termed a "lazy wave configuration" due to the formation of a smooth wave on the structure 102 between the facility 120 and the touchdown point 112. Furthermore, the configuration 108 is termed "steep wave configuration" since a substantially steep wave (in comparison with the wave in the lazy wave configuration 106) is formed between the facility 120 and the touchdown point 112. Configuration 110 is termed as "lazy S configuration" since the structure 102 assumes a catenary "S" shape between the facility 120 and the touchdown point 112.

Due to the length of the structure 102 between the facility 120 and the touchdown point 112, the pipe may experience multiple forces. Examples of these forces may include, but are not limited to, bending forces applied by the water around the structure 102, vortex induced vibrations (VIV) due to water currents flowing over a circular cross-section of the structure 102, forces applied by the facility 120 due to the motion the waves related motion that the facility 120 experiences. In addition, during installation of the structure 102, the structure 102 is released from a circular spool thus straightening a bent structure 102. Further, a longitudinal force is also applied on the structure 102 to submerge the structure 102 under water. These forces may lead to multiple deformations in the structure 102. Examples of deformation include, but are not limited to, shrinking of the cross-section, breakage, movement of the touchdown point 112, and the like. It becomes important for oil and gas companies to monitor the changes being caused to the structure 102 by the forces acting on it. The system and method, as explained in the forthcoming paragraphs, enables monitoring stresses acting on structures such as the structure 102.

Figure 2:
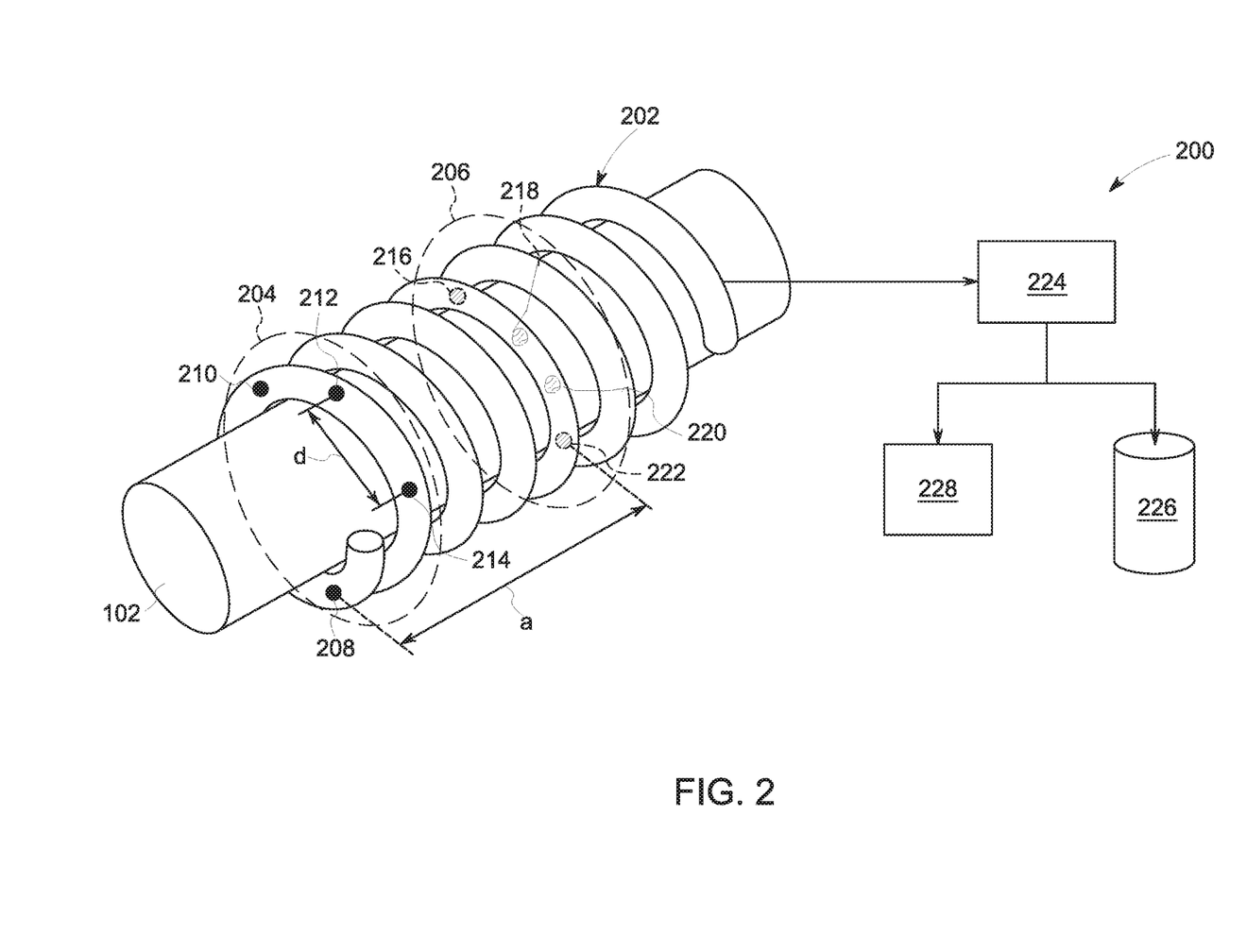
FIG. 2 is a diagrammatical representation of a sensing system configured to be placed along structures, according to one embodiment of the present invention.

FIG. 2 is diagrammatical representation of a sensing system 200 configured to monitor a structure 102, in accordance with an embodiment of the present invention. The sensing system 200 includes an optical fiber 202 that is disposed helically around a structure 102. For example, as shown in FIG. 2, the optical fiber 202 is disposed helically around a structure such as a pipe, whether in the form of a top-side or land-based pipe or a subsea riser pipe for example. The optical fiber 202 is disposed such that at least one complete helical turn covers the longitudinal length of the structure. In certain embodiments, a plurality of helical turns of the optical fiber 202 may be utilized to cover the longitudinal length of the structure (as shown in FIG. 2). The optical fiber 202 may also be placed to cover only a section of interest of the structure. For example, in certain embodiments when only joints of the structure 102 may need monitoring, the optical fiber 202 may be disposed only around the joint of the structure 102 such that the entire longitudinal length of the joint of the structure 102 is covered by one helical turn of the optical fiber 202.

The sensing system 200 further includes at least one fiber Bragg grating (FBG) set 204 and 206 that includes a plurality of FBGs 208, 210, 212, 214, and 216, 218, 220, 222, respectively. The plurality of FBGs 208, 210, 212, 214, 216, 218, 220, and 222 are defined in such a way that all the FBGs in a particular set fall on one complete helical turn of the optical fiber 202. For example, the FBGs 208, 210, 212, and 214 of the set 204 fall on one helical turn of the fiber 202 and the FBGs 216, 218, 220, and 222 of the set 206 fall on another helical turn of the fiber 202. Each FBG is configured to generate reflected light that is indicative of strain values at its location on the optical fiber 202. In one embodiment, the FBGs 208, 210, 212, 214, 216, 218, 220, and 222 are scores or gratings internal to the optical fiber 202 used to measure the wavelength of reflected light, wherein the longer the wavelength, the greater the strain value at the location of the FBGs.

While the illustrated example discloses an optical fiber 202 with 8 FBGs defined along the longitudinal measurement of the fiber 202, any number of FBGs may be defined along the longitudinal measurement of the fiber 202. However, the embodiments described herein enable the use of a fewer number of sensors as compared to prior art techniques.

More specifically, in one embodiment, the number of FBGs defined along the optical fiber 202 is dependent on a number of stress values to be determined which is dependent on the degrees of freedom available to the structure 102. For example, in the example illustrated in FIG. 2, the system is configured to determine bending moment acting on two planes of the structure 102, tensile force acting on the structure 102, and torsional moment acting on the structure 102. Hence, the number of FBGs defined in each set 204 and 206 is four (4). Similarly, when the structure monitored by the system 200 has less than 3 degrees of freedom, a lesser number of FBGs may be defined on the optical fiber 202.

The location of the FBGs 208, 210, 212, 214, 216, 218, 220, and 222 on the optical fiber 202 with respect to a starting tip of the optical fiber 202, according to certain embodiments, may be dependent on a mode shape that is determined through the stresses acting on the structure. In particular, the placement of FBGs that are defined on the optical fiber 202 may be dependent on a natural frequency of the mode shape of interest, the mode shape of interest itself, and a longitudinal measurement of the structure being monitored. In case of the illustrated structure 102, if a longitudinal measurement of the pipe is 4000 m, a natural frequency of the mode shape of interest is not greater than 1 Hz, and 100 fundamental mode shapes are of interest for monitoring, the sets 204 and 206 may be spaced apart from each other by approximately 40 m. Hence, to cover the entire longitudinal surface of a 4000 m structure 102, approximately 100 FBG sets may be required.

The system 200 further includes a processing system 224 that is communicably coupled to the optical fiber 202. The processing system 224 is configured to determine location coordinates of the plurality of FBGs 208, 210, 212, 214, 216, 218, 220, and 222 and values of one or more of bending moment, tensile force, and torsional moment acting on the structure 102 at each FBG location on the optical fiber 202.

The processing system 224, in certain embodiments, may comprise one or more central processing units (CPU) such as a microprocessor, or may comprise any suitable number of application specific integrated circuits working in cooperation to accomplish the functions of a CPU. The processing system 224 may include a memory. The memory can be an electronic, a magnetic, an optical, an electromagnetic, or an infrared system, apparatus, or device. Common forms of memory include hard disks, magnetic tape, Random Access Memory (RAM), a Programmable Read Only Memory (PROM), and EEPROM, or an optical storage device such as a re-writeable CDROM or DVD, for example. The processing system 224 is capable of and configured to execute program instructions, related to the determination of strain, and functioning in response to those instructions or other activities that may occur in the course of or after determining strain. Such program instructions will comprise a listing of executable instructions for implementing logical functions. The listing can be embodied in any computer-readable medium for use by or in connection with a computer-based system that can retrieve, process, and execute the instructions. Alternatively, some or all of the processing may be performed remotely by additional processing systems 224.

During operation, light from a light source is passed through the optical fiber 202. A portion of the light gets reflected at each FBG 208, 210, 212, 214, 216, 218, 220, and 222. The reflected light is received by the processing system 224 and analyzed to obtain the strain value at the location of the FBGs 208, 210, 212, 214, 216, 218, 220, and 222 on the optical fiber 202 that is placed around the structure 102.

The strain values determined by the processing system 224 are indicative of different kinds of stresses acting on the location of the structure 102 where the FBGs 208, 210, 212, 214, 216, 218, 220, and 222 are placed. According to embodiments of the present invention, the processing system is configured to determine different stress values acting at the location of FBGs 208, 210, 212, 214, 216, 218, 220, and 222 to accurately predict the shape of the structure 102 at different locations.

While determining one or more of bending moment, tensile stress, and torsional moment, the processing system 224 is configured to determine location coordinates of each FBG 208, 210, 212, 214, 216, 218, 220, and 222. The location coordinates of the FBGs 208, 210, 212, 214, 216, 218, 220, and 222 include, but are not limited to, a longitudinal measurement of each FBG 208, 210, 212, 214, 216, 218, 220, and 222 from a known position proximate to the structure 102 and an orientation angle of each FBG 208, 210, 212, 214, 216, 218, 220, and 222 with respect to a curvature of the outer surface of the structure 102. The known position proximate to the structure 102 may be a point of origin of the structure 102 from the surface facility (for e.g. facility 110).

The processing system 224 is configured to determine the longitudinal measurement of each FBG 208, 210, 212, 214, 216, 218, 220, and 222 based on a distance (x) between the known position and the first FBG from the FBG set and a distance (d) between two FBGs in the FBG set.

According to certain embodiments, the distance (x) between the known position and the first FBG 208 may be fixed during installation. For example, during installation when the optical fiber 202 is being wound helically around the structure 102, the optical fiber 202 is wound such that the first FBG 208 is located at a predetermined distance away from the known position. In some embodiments, the distance between the first FBG 208 and the known position is measured after installation using known length measurement techniques. In some embodiments, real-time determination of the distance between the known position and the first FBG 208 may be achieved by employing imaging devices and analyzing images received from the imaging devices.

To determine the longitudinal measurement of each FBG 208, 210, 212, and 214 from the FBG set 204, the processing system 224 utilizes the distance (x) between the known position on the structure 102 and the first FBG 208. Further, the processing system 224 also utilizes the distance between the FBGs 208 and 210 and the distance between the FBGs 210 and 212, and FBGs 212 and 214. In certain embodiments, the distance between the FBGs 208, 210, 212, and 214 may be equal to each other. In other embodiments, the distance between FBGs 208 and 210 may be different from the distance between FBGs 210 and 212, and that between FBGs 212 and 214.

For example, if the distance between the known position and the first FBG 208 is "x" and the distance between the FBGs 208 and 210 is "d", the longitudinal measurement of the FBG 210 is "x+d". Further, if the distance between FBGs 210 and 212 is also "d", longitudinal measurement of the FBG 212 is "x+2d". In embodiments, where multiple FBG sets are defined on the optical fiber 202, the distance between the FBG sets is utilized to determine the longitudinal measurement of all FBGs from the known position. For example, with respect to the embodiment in FIG. 2, a distance (a) between the sets 204 and 206 is utilized to determine the longitudinal measurements of the FBGs 216, 218, 220, and 222.

The processing system 224 is also configured to determine the orientation angle (θ) of each FBG 208, 210, 212, 214, 216, 218, 220, and 222 with respect to the longitudinal axis of the optical fiber 202. The processing system is configured to determine bending moment ($M_{x\_i}$), tensile force ($T_i$), torsional moment ($V_{x\_i}$) and the orientation angle (θ) for each FBG 208, 210, 212, 214, 216, 218, 220, and 222 by solving the equation (1):

$$\frac{\varepsilon_{z\_ij'}}{\cos^2\alpha} = \left(\frac{M_{x\_i} * r * \sin(\theta_{ij})}{I} + \frac{T_i}{A}\right) * (\cos^2\alpha) - \left(\frac{V_{x\_i}}{A}\right)\sin(\alpha)\cos(\alpha) \quad (1)$$

where, "i" is an integer greater than or equal to 1 and represents a particular FBG set; "j" is an integer greater than or equal to 1 and represents an FBG from the FBG set; A is an annular area of the structure 102; $\varepsilon_{z\_ij}$ is the strain value measured by the FBG "j" in the FBG set "i", $M_{x\_i}$ is a bending moment acting on an X-axis of the structure 102 as the location of FBG set "i"; r is the radius of the helix defined by the optical fiber 202; $\theta_{ij}$ is the orientation angle of the FBG "j" from the FBG set "i'"; $T_i$ is the tensile force acting on the structure 102 at the location of FBG set "i"; I is the moment of inertia of the structure 102; α is the angle of the helix defined by the optical fiber 202; and $V_{x\_i}$ is the torsional moment acting on the structure 102 at the location of FBG set "i".

In the example illustrated in FIG. 2, the set 204 may have a value of "i" as 1; whereas the set 206 may have a value of "i" as 2. For the set 204 (i=1), the FBGs 208, 210, 212, and 214 may be represented by changing the value of "j" from 1 to 4. Similarly, for the set 206 (i=2), the FBGs 216, 218, 220, and 222 may be represented by changing the value of "j" from 1 to 4.

Based on strain values ($\varepsilon_{z\_ij'}$) measured by each FBG 208, 210, 212, 214, 216, 218, 220, and 222 on the structure 102, 4 equations for each FBG set 204 and 206 can be written with the help of Equation 1. In Equation 1, values of $\varepsilon_{z\_ij'}$, α, r, A, and I are known. The values of $M_{x\_i}$, $T_i$, $\theta_{ij}$, and $V_{x\_i}$ need to be determined by the processing system 224. For each FBG set, the processing system 224 is configured to determine 4 unknown values from 4 equations. The processing system 224 may be configured to determine the 4 unknown values by solving the 4 equations simultaneously. The processing system 224 may also be configured to solve the 4 equations using known iterative methods for linear equations, or any known Gaussian elimination methods.

The values of θ and M, T, and V for a particular FBG in each FBG set 204 and 206 provide for the processing system to recreate the shape of the structure 102 at each location coordinate. Shape reconstruction based on values of M, T, and V provides vital information in understanding touchdown point movement of the structure 102. The system 200, according to one embodiment, may include a user interface 228 that is configured to create a visual representation of the strain values at each FBG location. Further, the user interface 228 may be configured to generate a map of bending moment, tensile force, and torsional moment acting on each FBG location along the optical fiber 202.

The system 200 further includes a data repository 226 that is configured to store strain values for location coordinates of each FBG 208, 210, 212, 214, 216, 218, 220, and 222. The data repository 226 may also be configured to store information pertaining to values of bending moment, tensile force, and torsional moment acting at each FBG 208, 210, 212, 214, 216, 218, 220, and 222 location on the optical fiber 202.

In certain embodiments, each FBG set 204 and 206 may include an extra FBG that is configured to determine a change in the pitch of the helically wound optical fiber 202 due to untwisting. In certain situations, due to the forces acting on the structure 102, the helically wound optical fiber 202 may untwist and may lead to a change in the pitch of the helix. Measurements at the extra FBG are utilized to obtain an extra equation with the help of Equation 1 described above. Further, the orientation angle (for example: $\theta_{11}$) of a particular FBG and the orientation angle (for example: $\theta_{12}$) of a subsequent FBG in the set are related to each other through Equation 2.

$$\theta_{12} - \theta_{11} = \frac{d}{H} \times 2\pi \quad (2)$$

Where d is the distance between the subsequent FBGs, and H is a length of the optical fiber 202 between the subsequent FBGs, which is determined based on the radius and the pitch of the helix.

With the extra FBG, a set of 5 equations is available for each FBG set 204 and 206. Further, a set of equations for the orientation angles for each FBG from the sets 204 and 206 is obtained using Equation 2. A mathematical solution for the 5 equations obtained from Equation 1 and the 5 equations obtained from Equation 2 is utilized to determine a value of H for the optical fiber 202. The value of H is utilized to determine the pitch of the helically wound optical fiber 202.

Figure 3:
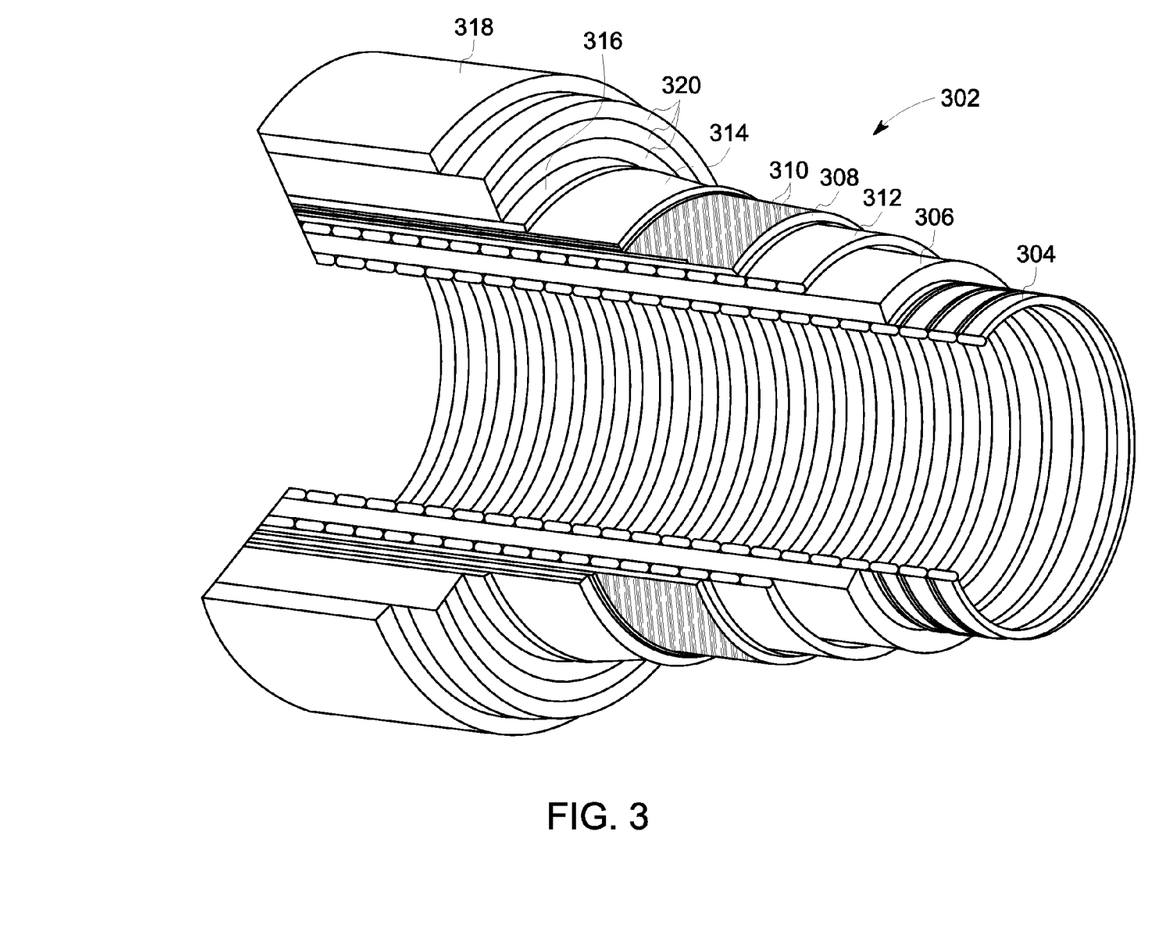
FIG. 3 is an illustration of structure capable of being monitored that includes a pipe and a casing, according to one embodiment of the present invention.

In one embodiment of the present invention, the structure includes a pipe and a casing that is bound to the outer surface of the pipe. A periphery of the casing is defined by bonding a plurality of helically disposed threads with the at least one optical fiber 202. An example of such a structure is illustrated in FIG. 3. FIG. 3 also illustrates how a pipe body 302 is formed from a composite of layered materials. Although a number of particular layers are illustrated in FIG. 3, embodiments described herein may be broadly applicable to composite pipes including two or more layers.

As illustrated in FIG. 3, the pipe body 302 typically includes an innermost carcass layer 304. The carcass provides an interlocked metallic construction that can be used as the innermost layer to prevent, totally or partially, collapse of an internal pressure sheath 306 due to pipe decompression, external pressure, tensile armor pressure and mechanical crushing loads.

The internal pressure sheath 306 acts as a fluid retaining layer and typically comprises a polymer layer that ensures internal-fluid integrity. It is to be understood that this layer may itself comprise a number of sub-layers. It will be appreciated that when the optional carcass layer is utilized the internal pressure sheath is often referred to as a barrier layer. In operation without such a carcass the internal pressure sheath may be referred to as a liner.

The casing 308 is a structural layer that increases the resistance of the flexible pipe to internal and external pressure and mechanical crushing loads. The casing 308 also structurally supports the internal-pressure sheath and typically consists of an interlocked metallic construction. The casing 308 typically includes a plurality of helically disposed threads 310 that are tightly coupled. The helically disposed threads 310, in one embodiment, are made from polymeric material. Further, according to one embodiment, one of the helically disposed threads 310 is the optical fiber 202. The helically disposed threads 310 are coupled together with the help of chemical adhesives or techniques such as pressure bonding.

The pipe body 302 may also include one or more layers of tape 312 and a first tensile armor layer 314 and second tensile armor layer 316. The layers 314 and 316 are used to sustain tensile loads and internal pressure. The pipe body 302 also typically includes an outer sheath 318 which comprises a polymer layer used to protect the pipe against penetration of seawater and other external environments, corrosion, abrasion and mechanical damage. One or more layers 320 of insulation may also be included.

The optical fiber 202, as explained in conjunction with FIG. 2, includes a plurality of FBGs that are configured to generate reflected light that is indicative of strain values at the location of the respective FBGs. The optical fiber 202 may be communicably coupled to the processing system 224 to determine location coordinates of the FBGs and values of bending moment, tensile stress, and torsional moment acting on the pipe 302 at each of the FBG locations.

Figure 4:
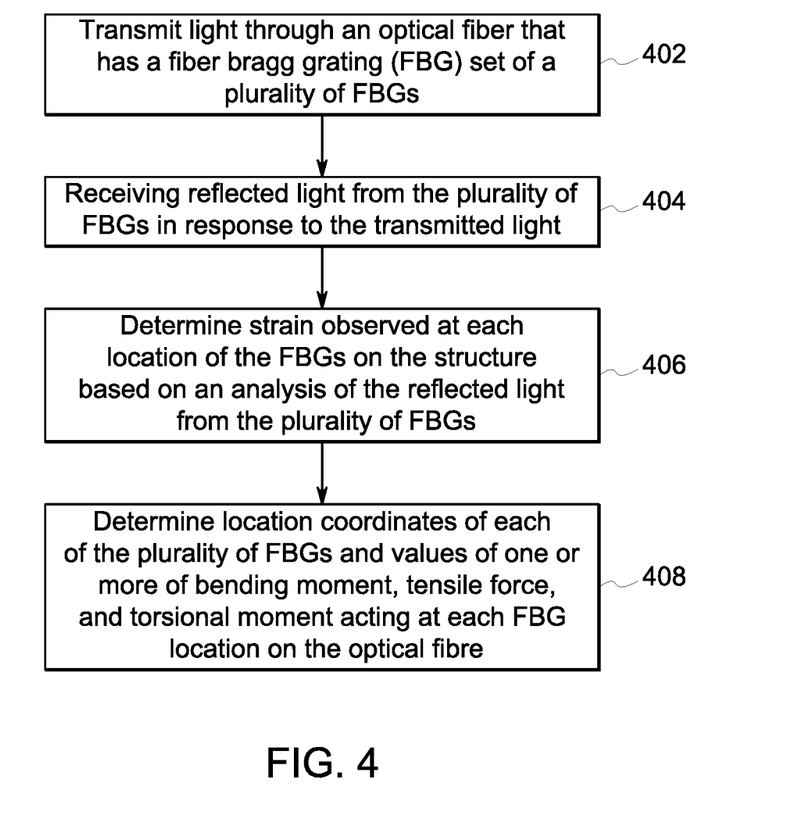
FIG. 4 is an illustration of a method for monitoring structures, according to one embodiment of the present invention.

FIG. 4 illustrates a method for monitoring a structure. The method may be utilized to monitor a structure such as the structure 102. The method includes, transmitting light through an optical fiber (for example: optical fiber 202) that is disposed helically around the structure along a longitudinal axis of the structure such that at least one helical turn of the optical fiber covers a longitudinal length of the structure (block 402). The optical fiber includes at least one FBG set (for example: set 204) that include a plurality of FBGs (for example: 208, 210, 212, and 214). The at least one FBG set is defined on the optical fiber such that all the FBGs from the at least one set lie on the helical turn that completely covers the longitudinal length of the structure.

Further, at 404, the method includes receiving reflected light from the plurality of FBGs. At 406, strain observed at each location of the plurality of FBGs is determined based on an analysis of the reflected light from the plurality of FBGs. Known methods of analysis of reflected light include, but are not limited to, determining a shift in a Bragg wavelength of the reflected light due to strain acting on the FBGs.

At 408, the method includes determining location coordinates of each of the plurality of FBGs and values of one or more of bending moment, tensile force, and torsional moment at each FBG location on the optical fiber. The method, according to one embodiment, includes determining at least one of a longitudinal measurement of each FBG from a known location on the structure and an orientation angle of each FBG with respect to a curvature of the structure as part of the location coordinates of the FBGs.

According to another embodiment, the method includes determining the longitudinal measurement of each FBG based on a distance between a first FBG from the FBG set and the known position proximate to the structure and a first distance between two adjacent FBGs in the FBG set. Further, the method includes determining the orientation angle and one of bending moment, tensile force, and torsional moment based on a geometrical relationship between the strain values observed by each FBG and the orientation angle. The geometrical relationship, according to one embodiment, may the relationship expressed in Equation 1 above.

The determined orientation angles and values of at least one of bending moment, tensile force, and torsional moment may be utilized to reconstruct a shape of the structure at each FBG location. The method also includes creating a visual representation of the structure based on the determined orientation angles and values of at least one of bending moment, tensile force, and torsional moment.

Various embodiments described above thus provide for a system and a method for monitoring a structure. The above-described embodiments of the system and method provide for an inexpensive way of determining the effect of stresses acting on various locations along the monitored structure. Further, the method and system also provides for a visual representation of stresses acting on various locations thereby aiding in determining structure shape owing to the stresses. The system and method also provide for a single optical fiber solution to determine various stresses. The same optical fiber may also be modified further to measure temperature, acoustics, and chemistry of the fluids flowing in the structure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for monitoring structures, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A sensing system comprising:
   an optical fiber disposed helically around an outer surface of an elongated structure along a longitudinal axis of the structure;
   a fiber Bragg grating (FBG) set comprising a plurality of FBGs in the optical fiber, wherein the FBGs in the set are configured to reflect light transmitted in the optical fiber as reflected lights that are indicative of strain values at locations of the FBGs in the optical fiber; and
   a processing system coupled to the optical fiber, wherein the processing system is configured to determine location coordinates of the FBGs and values of one or more of bending moment, tensile force, or torsional moment acting at locations of the FBGs in the optical fiber based on the reflected lights, the processing system also configured to identify a shape of the structure along the longitudinal axis of the structure based on the reflected lights from the FBGs.

2. The sensing system of claim 1, wherein the location coordinates comprise at least one of longitudinal measurements of the locations of the FBGs from a known position proximate to the structure or orientation angles of the FBGs with respect to a curvature of the outer surface of the structure.

3. The sensing system of claim 2, wherein the processing system is configured to:
   determine the longitudinal measurements of the FBGs based on distances between the known position proximate to the structure and a first FBG in the FBG set and a distance between adjacent FBGs in the FBG set; and
   determine the orientation angles and the values of the one or more of the bending moment, the tensile force, or the torsional moment based on one or more geometrical relationships between the strain values indicated by the reflected lights that are reflected by the FBGs and the orientation angles.

4. The sensing system of claim 1, wherein the structure comprises a riser pipe.

5. The sensing system of claim 1, wherein the structure comprises:
   a pipe; and
   a casing coupled to an outer surface of the pipe, wherein a plurality of helically disposed threads and the optical fiber are bonded together to define an outer surface of the casing.

6. The sensing system of claim 1, wherein the structure comprises at least one of a casing, a sand screen, an umbilical, a tubing, or a pipeline.

7. The sensing system of claim 1, further comprising a plurality of the FBG set disposed on different helical turns of the optical fiber.

8. The sensing system of claim 1, further comprising a data repository configured to store the strain values in relation with the location coordinates determined for the FBGs.

9. The sensing system of claim 1, further comprising a user interface configured to generate a visual representation of the strain values at the locations determined for the FBGs on the structure.

10. A method comprising:
    transmitting light through an optical fiber, wherein the optical fiber comprises a fiber Bragg grating (FBG) set that comprises a plurality of FBGs, and wherein the optical fiber is disposed helically around an elongated structure along a longitudinal axis of the structure;
    receiving light that is reflected from the FBGs in response to the transmitted light;
    determining strains at locations of the FBGs on the structure based on the light that is reflected from the FBGs;
    determining location coordinates of the FBGs and values of one or more of a bending moment, a tensile force, or a torsional moment acting at the locations of the FBGs in the optical fiber; and
    identifying a shape of the structure along the longitudinal axis of the structure based on the light that is reflected from the FBGs.

11. The method of claim 10, wherein the location coordinates comprise at least one of longitudinal measurements of the locations of the FBGs from a position proximate to the structure or orientation angles of the FBGs with respect to a curvature of an outer surface of the structure.

12. The method of claim 11, further comprising:
    determining the longitudinal measurements of the FBGs based on distances between the position proximate to the structure and a first FBG in the FBG set and a distance between adjacent FBGs in the FBG set; and
    determining the orientation angles and the values of the one or more of the bending moment, the tensile force, or the torsional moment based on one or more geometrical relationships between the strains determined based on the light that is reflected from the FBGs and the orientation angles.

13. The method of claim 12, further comprising generating a visual representation of the shape of the structure based on the values of the location coordinates of the FBGs and the values of the one or more of the bending moment, the tensile force, or the torsional moment at the locations of the FBGs.

14. The method of claim 10, further comprising disposing the optical fiber such that a plurality of helical turns of the optical fiber covers a longitudinal length of the structure.

15. The method of claim 14, further comprising disposing a plurality of the FBG set in the optical fiber such that each of the FBG sets is disposed on a different helical turn of the optical fiber.

16. The method of claim 10, further comprising generating a visual representation of the strains determined based on the light that is reflected at the location coordinates of the FBGs.

17. A sensing system comprising:
    an optical fiber disposed helically around an outer surface of an elongated structure along a longitudinal axis of the structure;
    a fiber Bragg grating (FBG) set comprising a plurality of FBGs in the optical fiber, wherein the FBGs in the set are configured to reflect light transmitted in the optical fiber as reflected lights; and
    a processing system coupled to the optical fiber to receive the reflected lights from the FBGs, the processing system determining locations of the FBGs, one or more of bending moment values, tensile force values, or torsional moment values at locations of the FBGs in the optical fiber, and a shape of the structure along the longitudinal axis of the structure based on the reflected lights from the FBGs.

18. The sensing system of claim 17, wherein the optical fiber is helically wound around the structure at a pitch and the processing system identifies changes in the pitch of the optical fiber based on the reflected lights received from the FBGs.

19. The sensing system of claim 17, wherein the processing system determines strains, the bending moment values, the tensile force values, and the torsional moment values in the structure based on the reflected lights and determines orientation angles of the FBGs relative to the longitudinal axis of the structure based on the strains, the bending moment values, the tensile force values, and the torsional moment values.

20. The sensing system of claim 19, wherein the optical fiber is helically wound around the structure at a pitch and the processing system identifies changes in the pitch of the optical fiber based on the orientation angles.

* * * * *